United States Patent

[11] 3,576,134

| [72] | Inventor | Samuel N. Fersht<br>Pasadena, Calif. |
|------|----------|------|
| [21] | Appl. No. | 706,426 |
| [22] | Filed | Feb. 19, 1968 |
| [45] | Patented | Apr. 27, 1971 |
| [73] | Assignees | Tetra Tech, Inc.<br>Pasadena, Calif.;<br>Santa Fe International Corporation<br>Los Angeles, Calif.; States Marine Lines,<br>Inc., New York, N.Y., a fractional part interest to each |

[54] GYROSCOPIC STABILIZER HAVING AN ADJUSTABLE SPRING
22 Claims, 6 Drawing Figs.

[52] U.S. Cl. .................................................. 74/5.22, 74/5.41
[51] Int. Cl. ............................................... G01c 19/30
[50] Field of Search .......................................... 74/5.41, 5.42, 5, 5.34, 5.22

[56] References Cited
UNITED STATES PATENTS

| 1,906,719 | 5/1933 | Richter | 74/5.41 |
| 2,290,232 | 7/1942 | Fischer | 74/(5.4UX) |
| 2,299,117 | 10/1942 | Manteuffel | 74/5.6 |
| 2,345,169 | 3/1944 | Wunsch et al. | 74/5.6 |
| 3,158,340 | 11/1964 | Sellers | 74/5.34 |
| 3,242,743 | 3/1966 | Samet | 74/5.7 |
| 3,279,263 | 10/1966 | Bell | 74/5.6 |
| 1,183,530 | 5/1916 | Brennan | 74/5.22 |
| 1,312,085 | 8/1919 | Sperry | 74/5.22 |

*Primary Examiner*—Manuel A. Antonakas
*Attorney*—Christie, Parker and Hale

ABSTRACT: A restoring torque is applied to the gimbal of a gyroscopic stabilizer by a spring having an adjustable restoring characteristic. In one embodiment, the restoring characteristic of the spring is nonlinear, increasing with the angular displacement of the gimbal from a reference position. The spring-restoring characteristic can be automatically adjusted responsive to changes in the frequency of the applied torque. To compensate for the adverse effects of rotational displacement of the supporting structure about the gimbal axis on the stabilization action, two identical stabilizers are employed that have rotors spinning in opposite directions and gimbals supported to rotate about parallel axes.

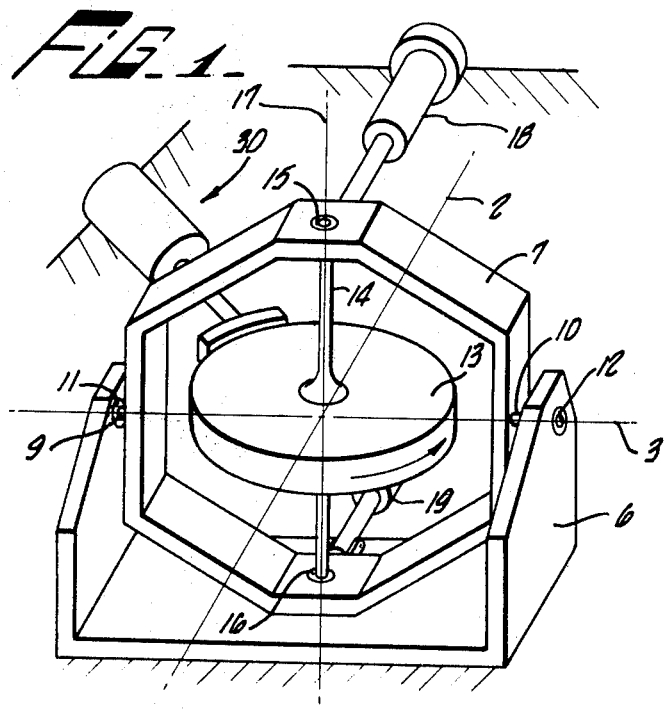
FIG. 1.
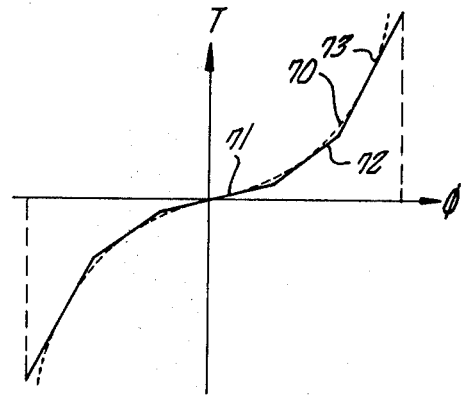
FIG. 6.
FIG. 2.
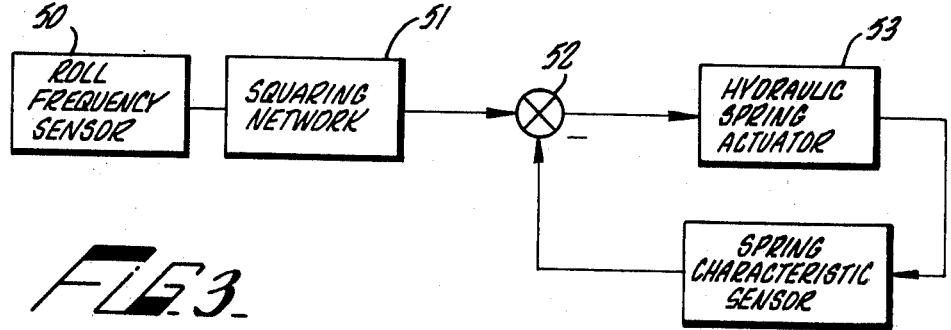
FIG. 3.
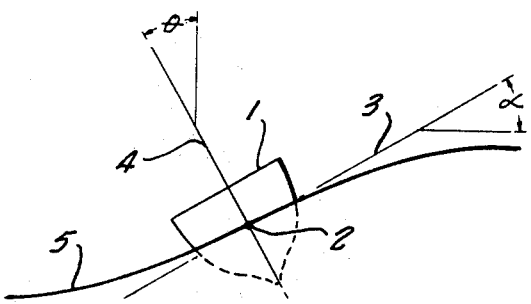
FIG. 4.
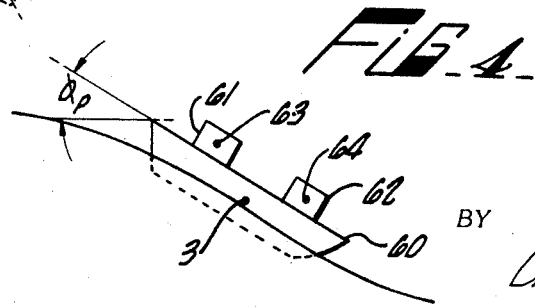
INVENTOR.
SAMUEL N. FERSHT
BY
Christie, Parker & Hale
ATTORNEYS

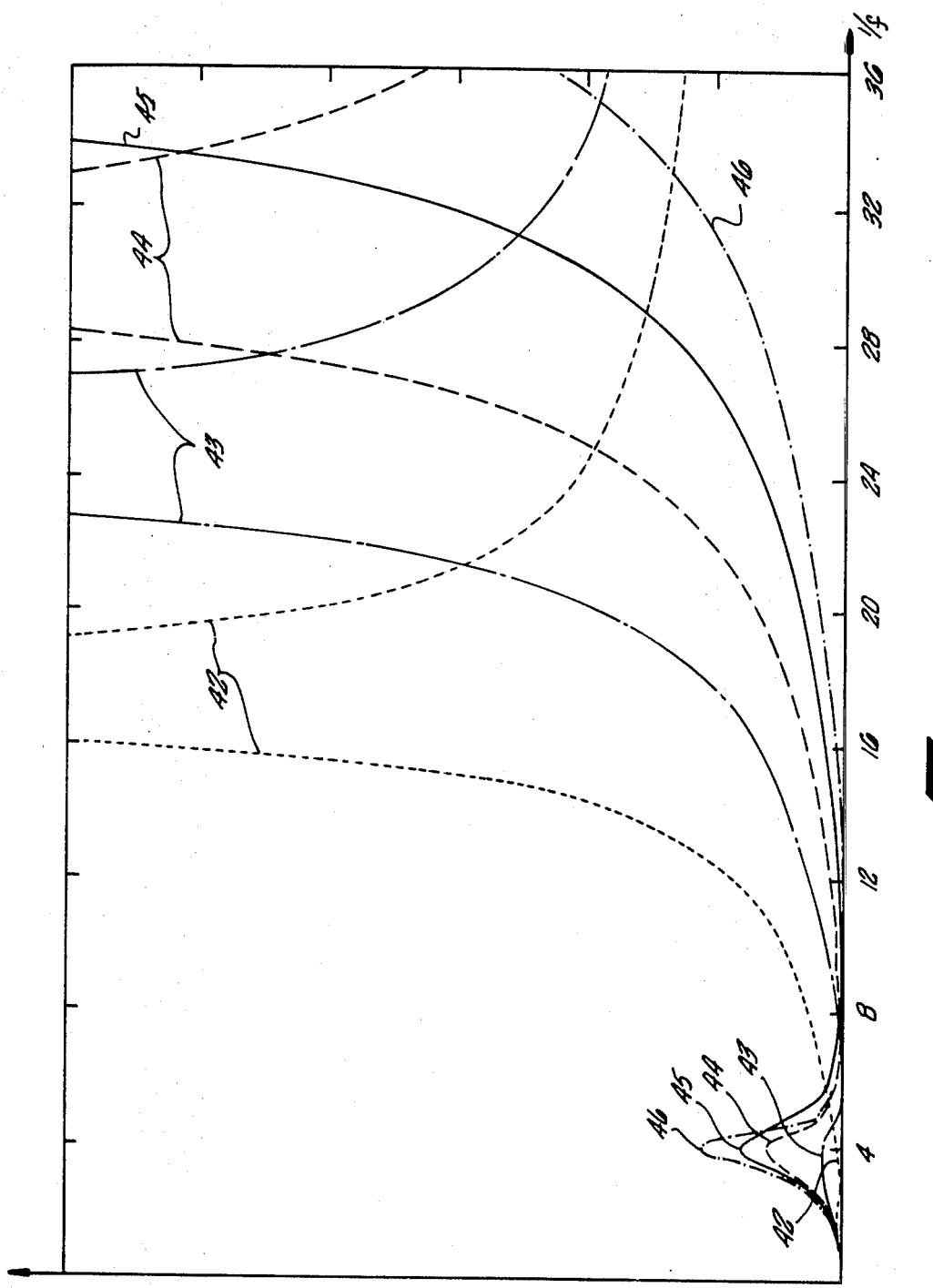

GYROSCOPIC STABILIZER HAVING AN ADJUSTABLE SPRING

BACKGROUND OF THE INVENTION

This invention relates to the stabilization of bodies against oscillatory angular displacement and, more particularly, to a gyroscopic instrument that provides extremely effective stabilization.

It has been known for many years that a gyroscope can be arranged to stabilize a body against oscillatory angular displacement. Gyroscopic stabilizers are employed in ships, for example, to reduce the roll of the ship about its longitudinal axis, which is a source of great discomfort in travel at sea. Theoretically, a passive gyroscopic stabilizer could serve the purpose. The difficulty with a passive device is that an extremely heavy rotor is required to achieve satisfactory stabilization and a large structure is needed to support the rotor. Typically, a passive gyroscopic stabilizer on a ship would have to weigh about one-twentieth of the ship's weight to operate effectively. For this reason, use of the passive stabilizer has been abandoned in favor of the active gyroscopic stabilizer or activated fin arrangements. The active stabilizer permits the use of a smaller rotor and supporting structure, but requires a good deal of additional equipment such as a control gyroscope, a motor, and mechanical linkages and gears. The active stabilizer is also more complicated in its operation than the passive stabilizer and is therefore more difficult to maintain in good working order. On the other hand, activated fins are only effective within a narrow range of relatively high speeds.

British Pat. specification No. 549,893, accepted Dec. 11, 1942, discloses a passive gyroscopic stabilizer mounted on a disc in order to damp vibrations of the disc about its axis. An adjustable rotary energy absorber is secured to the shaft on which the gimbal rotates and springs are connected between the gimbal and the disc on opposite sides of the axis of gimbal rotation. The springs exert a restoring torque on the gimbal when it is angularly displaced from a reference position. The stiffness of the springs is chosen to give a preselected natural frequency to the gyroscopic system. No further elaboration concerning the spring characteristics is disclosed in this British specification.

SUMMARY OF THE INVENTION

According to the invention, a restoring torque uniquely proportional to the angular displacement about the gimbal axis from a reference position is applied to the gimbal of a gyroscopic stabilizer that is mounted on a body to be stabilized. The ratio of the restoring torque to the angular displacement of the gimbal is so selected with respect to the frequency of the oscillatory torque applied to the body that this frequency lies substantially between the peaks of the angular displacement of the body about the stabilization axis as a function of the frequency of the applied torque. As a result, much more effective stabilization takes place than heretofore was though possible with a passive gyroscopic stabilizer. If the applied torque is simple harmonic or approximates simple harmonic, the ratio of the restoring torque to the angular displacement substantially equals $I_2 (2\pi f)^2$, where $f$ is the frequency of the applied torque and $I_2$ is the moment of inertia of the gimbal assembly about the gimbal axis.

A feature of the invention is the application of the restoring torque with a device having an adjustable restoring characteristic, such as a hydraulic spring. Thus, the ratio of the restoring torque to the angular displacement can be adjusted as the frequency of the applied torque changes. This feature is particularly advantageous for stabilizing a ship at sea because the frequency of the waves encountered in the sea changes from time to time. It has been discovered that the adjustment of the spring-restoring characteristic is effective to adapt a gyroscopic stabilizer on board ship to changes in frequency of sea waves, whereas the adjustment of the damping coefficient about the gimbal axis is not effective in this respect.

Most advantageously, the frequency of the applied torque is sensed and the restoring characteristic is automatically adjusted responsive to changes in the sensed frequency. To reduce the angular displacement of the gimbal due to precession without adversely affecting stabilization, a nonlinear restoring characteristic is utilized, i.e., a restoring characteristic varying as a function of the annular displacement of the gimbal. Specifically, the restoring characteristic increases with increasing angular displacement of the gimbal from the reference position. Stabilization is the consideration that governs the selection of the value of the restoring characteristic in the vicinity of the reference position, while the tolerable precessional angular displacement is the consideration that governs the selection of the value of the restoring characteristic in the vicinity of the ends of the angular excursion of the gimbal. Between these two values, the value of the restoring characteristic is preferably selected to provide a smooth transition so as to avoid hard impacts on the frame and gimbal of the stabilizer.

Another feature of the invention is the provision of two identical gyroscopic stabilizers with gimbals supported to rotate in parallel axes and rotors that spin in opposite directions. As a result, the effect of angular displacement about an axis parallel to the gimbal axes on the stabilizing action is cancelled, the effect on the one stabilizer being equal and opposite to the effect on the other stabilizer.

BRIEF DESCRIPTION OF THE DRAWINGS

The features of a specific embodiment of the invention are illustrated in the drawings, in which:

FIG. 1 is a diagram of a gyroscopic stabilizer with adjustable hydraulic springs;

FIG. 2 is a block diagram of a control system for automatically adjusting the restoring characteristic of the springs of FIG. 1;

FIG. 3 is a front elevation view of a ship at sea;

FIG. 4 is a side elevation view of a ship at sea with two identical gyroscopic stabilizers;

FIG. 5 is a graph illustrating typical frequency response curves for different spring-restoring characteristics; and FIG. 6 is a graph of ideal and actual nonlinear spring-restoring characteristics.

DESCRIPTION OF A SPECIFIC EMBODIMENT

The invention is particularly well suited for stabilizing a ship at sea against roll about the ship's longitudinal axis caused by sea waves. For this reason, the invention is described in connection with the stabilization of a ship against roll. The principles are applicable, however, to any type of body subjected to oscillatory torques. In FIG. 3, a ship 1 is shown having a longitudinal axis 2, an athwart axis 3, and a vertical axis 4 that intersects axes 2 and 3. As the free surface of the sea designated 5 undulates, ship 1 is subjected to oscillatory torques that are most pronounced about axis 2, i.e., the roll axis of ship 1. In FIG. 3, ship 1 is depicted with an angular displacement $\theta$ from its level position and the free surface of the water at ship 1 is depicted as having a slope $\alpha$. Without stabilization, the ratio $\left|\dfrac{\theta}{\alpha}\right|$ may become as large as 50 to 100. The purpose of stabilization is to reduce this ratio to a value below unity and ideally to zero. If the ratio were zero, ship 1 would remain perfectly level regardless of the slope of the waves.

In FIG. 1, a gyroscopic stabilizer is shown having a supporting structure 6 that is fixed to ship 1 (FIG. 3). A gimbal 7 is rotatably mounted with respect to structure 6 about athwart axis 3. Trunnions 9 and 10 are fixed to opposite sides of gimbal 7 and extend therefrom along axis 3 to bearings 11 and 12, respectively, embedded in structure 6. A rotor 13 is mounted on a shaft 14 that is rotatably supported by bearings 15 and 16 embedded in opposite sides of gimbal 7. Rotor 13 includes conventional electrical or pneumatic means (not shown) for causing it to spin about an axis 17. Most effectively, axis 17 is perpendicular to axis 3, but theoretically, it could be any axis nonparallel to axis 3. Conventional hydraulic springs 18 and 19 are connected between the body of ship 1 and gimbal 7 on opposite sides of axis 3. Springs 18 and 19 exert a force when displaced in either direction from a relaxed position. This force is directly proportional to displacement. Springs 18 and 19 are initially adjusted so they are in the relaxed position when gimbal 7 assumes a reference position about axis 3 with respect to ship 1, preferably the position in which spin axis 17 is perpendicular to axis 2. In such case, no restoring torque is applied to gimbal 7. Any time gimbal 7 undergoes an angular displacement about axis 3 from the reference position, springs 19 and 18 exert forces on gimbal 7 in opposite directions. As a result, a restoring torque is applied to gimbal 7, which for small angular displacements is a linear function of, i.e., proportional to, the angular displacement of gimbal 7 about axis 3 from the reference position. Hydraulic springs 18 and 19 could comprise a piston that moves through a cylinder filled with air. A vessel in communication with the cylinder is filled with air and oil separated by a movable membrane. The restoring characteristic of springs 18 and 19 is dependent upon the compressibility of the air used in the cylinder. This characteristic is adjusted by changing the ratio of air to oil in the vessel in accordance with well-known techniques. When the quantity of oil in the vessel is increased, the quantity of air decreases and the restoring characteristic increases. A cylinder actuated brake 30 permits a reduction in the angular velocity of spin of rotor 13.

When the sea exerts a torque on ship 1 about axis 2, precession takes place, thereby turning rotor 13 and shaft 14 about axis 3. Consequently, gimbal 7 is displaced about axis 3 from the reference position and springs 18 and 19 exert a restoring torque on gimbal 7. This and other restoring torques exerted on gimbal 7 in turn give rise to a moment about axis 2 that counteracts the ship's roll about axis 2.

The equations of angular motion of ship 1 about axis 2 and the gyroscopic stabilizer of FIG. 1 about axis 3, respectively, are:

(1) $I_1\ddot{\theta}+C_1\dot{\theta}+Wh\theta+J\Omega\dot{\Phi}+Wh\alpha t)$ and (2) $I_2\ddot{\Phi}+C_2\dot{\Phi}+l^2\Phi-J\Omega\dot{\theta}=0$ where:

$I_1$ is the moment of inertia of the ship about roll axis 2,
$C_1$ is the damping coefficient of the ship about roll axis 2,
W is the weight of the ship,
h is the metacentric height of the ship,
J is the moment of inertia of rotor 13 and shaft 14 about axis 17,
$\Omega$ is the angular velocity at which rotor 13 spins,
$I_2$ is the moment of inertia of the gimbal assembly (gimbal 7, rotor 13, trunnions 9 and 10, and shaft 14) about axis 3,
$C_2$ is the damping coefficient of the gimbal assembly about axis 3,
K is the restoring characteristic of springs 18 and 19,
l is the distance between the points of contact of springs 18 and 19 with gimbal 7,
$\theta$ is the angular displacement of ship 1 about axis 2 from its level position,
$\Phi$ is the angular displacement of gimbal 7 about axis 3 from the reference position,
$\alpha(t)$ is the slope of the free surface of the sea at ship 1 as a function of time,
the double dots over $\theta$ and $\Phi$ represent the second derivative with respect to time, and
the single dots over contact $\theta$ and $\Phi$ represent the first derivative with respect to time.

The above equations neglect the pitch of the ship about axis 3, assume that the value of the angular displacements $\Phi$ and $\theta$ remains substantially smaller than 1, and assume that the beam of ship 1 is smaller than one-half wavelength of the sea. In equation (1) reading from left to right, the first term represents the inertia of the ship about axis 2, the second term represents the damping of the ship about axis 2, the third term represents the restoring torque urging the ship to return to the level position, the fourth term represents the precessional torque due to the angular velocity of the gimbal assembly about axis 3, and the fifth term represents the torque exerted on the ship by the sea. In equation (2) reading from left to right, the first term represents the inertia of the gimbal assembly about axis 3, the second term represents the damping of the gimbal assembly about axis 3, the third term represents the restoring torque applied to gimbal 7 by springs 18 and 19, and the fourth term represents the precessional torque due to the angular velocity of the ship about axis 2. Assuming that the torque exerted on the ship is simple harmonic, i.e., the slope $\alpha(t)$ of the sea at ship 1 varies sinusoidally as a function of time with a maximum slope of $\alpha_0$, the angular displacement $\theta$ of the ship about axis 2 varies sinusoidally as a function of time with a maximum displacement $\theta_0$, and the angular displacement $\Phi$ of gimbal 7 about axis 3 varies sinusoidally as a function of time with a maximum displacement $\Phi_0$, equations (1) and (2) yield the following relationships as a function of the frequency $f$ of the sea (i.e., the frequency of the applied torque):

(3)
$$|\theta_0|=\left\{\frac{(w_2^2-w^2)^2+4u_2^2w^2}{[(w_1^2-w^2)(w_2^2-w^2)-pq\Omega^2w^2-4u_1u_2w^2]^2+4w^2[u_1(w_2^2-w^2)+u_2(w_1^2-w^2)]^2}\right\}^{1/2}w_1^2\alpha_0$$

(4)
$$|\phi_0|=\frac{q\Omega ww_1^2\alpha_0}{\left\{[(w_1^2-w^2)(w_2^2-w^2)-pq\Omega^2w^2-4u_1u_2w^2]^2+4w^2[u_1(w_2^2-w^2)+u_2(w_1^2-w^2)]^2\right\}^{1/2}}$$

where:

$$w_1^2=\frac{Wh}{I_1} \qquad w_2^2=\frac{Kl^2}{I_2} \qquad u_1=\frac{1}{2}\frac{C_1}{I_1}$$

$$u_2=\frac{1}{2}\frac{C_2}{I_2} \qquad p=\frac{J}{I_1} \qquad q=\frac{J}{I_2}$$

and $$w=2\pi f$$

The purpose of a ship stabilizer in terms of equation (3) is to make the value of $|\theta_0|$ as small as possible. According to one aspect of the invention, the value of $|\theta_0|$ is made very small by making $w_2^2$ equal to $w^2$ when the applied torque can be considered to be simple harmonic. In other words, the ratio of the restoring torque on gimbal 7 due to springs 18 and 19 to the angular displacement, which ratio is $Kl^2$, is made equal to $I_2(2\pi f)^2$. In such case, the amplification factor of the ship and stabilizer is given as follows:

(5) $$\frac{|\theta_0|}{\alpha_0}=\frac{2u_2w_1^2}{[w^2(pq\Omega^2+4u_1u_2)^2+4u_2^2(w_1^2-w^2)]^{1/2}}$$

Conventional ship and stabilizer parameters are of such value that the numerator of equation (5) is much smaller than the denominator over the entire range of frequencies normally encountered at sea without using a rotor of impracticable size. Typically, stabilization with an amplification factory of 0.05 or better can be achieved with a stabilizer that weighs less than 1.5 percent of the ship. The value of $w_2^2$ can be simply and conveniently altered as the frequency of the sea waves changes by manually adjusting the restoring characteristic K of springs 18 and 19. Thus, the optimum amplification factor represented by equation (5) can be easily preserved. The adjustment of any other parameter than $w_2^2$ (including the damping coefficient $C_2$) would not permit the optimum amplification factor of equation (5) to be preserved as the frequency of the sea waves changes.

FIG. 5 is a graph depicting the amplification factor as a function of the reciprocal $1/f$ of the frequency of the sea waves, i.e. the period of the sea waves, for a spring-restoring characteristic K having various discrete values. These response curves are based on the same assumptions made above. Response curves 42, 43, 44, 45, and 46 represent the amplification factor for respectively decreasing values of restoring characteristic K between infinity and zero. Curves 42 to 46 each have a high-frequency peak on the left, a low-frequency peak on the right, and a trough between the high- and low-frequency peaks at which the optimum stabilization takes place. As illustrated in FIG. 5, the troughs of the curves progress from left to right as the value of the restoring characteristic K decreases. For example, curves 42, 43, 44, 45, and 46 have troughs at approximately 3, 6, 8, 10, and 12 seconds respectively. The value of the restoring characteristic K for the stabilizer of FIG. 1 is selected so $1/f$ lies substantially between the high- and low-frequency peaks of the amplification factor as a function of frequency, i.e., near the trough of the appropriate response curve. As the frequency $f$ of the waves changes, the restoring characteristic K is preferably adjusted to keep the trough of the response curve at $1/f$.

FIG. 2 depicts a system for automatically adjusting the restoring characteristic K of springs 18 and 19. A roll frequency sensor 50 produces an electrical signal that is proportional to the frequency of the angular displacement of ship 1 about roll axis 2. Sensor 50 could comprise a small gyroscope and a transducer for converting the precessional displacement of the gyroscope into an electrical signal. The output of sensor 50 is coupled through an amplitude-squaring network 51 to a summing junction 52 where it is combined with a signal proportional to the actual restoring characteristic of springs 18 and 19, which is initially set so $w_2^2$ equals $I_2(2\pi f)^2$, for the then prevailing frequency of the sea waves. The differences of these signals is applied to a hydraulic spring actuator 53 to change the restoring characteristic of springs 18 and 19. Assuming springs 18 and 19 are of the type described above in connection with FIG. 1, actuator 53 could be a valve that either admits more oil to the vessel, at the same time forcing air out of the vessel and increasing the spring-restoring characteristic, or withdraws oil from the vessel, at the same time drawing air from a source into the vessel and decreasing the spring-restoring characteristic. A spring characteristic sensor 54 produces an output signal proportional to the actual restoring characteristic of springs 18 and 19. Sensor 54 could be a mass flowmeter that measures the quantity of air in the cylinder at any particular time. As actuator 53 changes the restoring characteristic of springs 18 and 19, the output of sensor 54 changes accordingly. In summary, the restoring characteristic of springs 18 and 19 is adjusted responsive to changes in the frequency of the waves of the sea so as to maintain an optimum amplification factor.

The preceding analysis is based on several assumptions that would not be valid in some cases. The first assumption is that the angular displacement $\Phi$ of gimbal 7 due to precession remains much smaller than one. In fact, the fourth term in the equation (1) and the fourth term in equation (2) are each multiplied by the factor $\cos \Phi$. The decrease in the precessional torque attributable to $\cos \Phi$ as $\Phi$ increases is offset in some measure by the increase in the precessional torque attributable to the increase in the angular velocity of gimbal 7, i.e., $\Phi$ resulting from the increase in $\Phi$. As a result, it has been found that the stabilizer is effective for precessional angular displacements as large as 45° which cannot be considered substantially smaller than one. Accordingly, the $\cos \Phi$ must be considered in equations (1) and (2) when large angular displacements $\Phi$ are contemplated. The second assumption is that the applied torque varies in a simple harmonic fashion as a function of time. In many conditions of the sea, this assumption is not justified. In such case, equations (1) and (2) must be solved for a stationary random sea state, which is an empirical procedure. An analysis of equations (1) and (2) for a large angular displacement $\Phi$ and analysis of equations (1) and (2) stationary random sea state with graphs of the power spectrum of a stabilized ship's roll at various wind speeds are treated in my paper entitled "A tuned Gyro-Stabilizer for Offshore Drilling Vessels," which was presented at the Offshore Exploration Conference in New Orleans, La. on Feb. 14 through 16, 1968, and published in the Proceedings of OECON, 1968.

In addition to optimum stabilization, there is another consideration in the selection of the restoring characteristic K of springs 18 and 19. The angular displacement $\Phi$ experienced by gimbal 7 due to precession is proportional to the peak height of the sea waves. Since the maximum angular displacement $\Phi$ for which the stabilizer is effective is 45°, there is a corresponding wave height that should not be exceeded if the stabilizer is to remain effective. In rough seas it is often likely this maximum wave height will be exceeded at the value of restoring characteristic K providing optimum stabilization. Therefore, special measures must be taken to reduce the angular displacement $\Phi$ due to precession. This can be done either by increasing the angular momentum $J\Omega$ of rotor 13 about axis 17 or by changing the restoring characteristic K. The former alternative is not attractive because it requires an increase in the size and/or speed of rotation of rotor 13. The latter alternative might seem to be unattractive because it appears to require a compromise in the spring-restoring characteristic K that would prevent optimum stabilization.

According to an important feature of the invention, however, the latter alternative is utilized to reduce the angular displacement $\Phi$ of gimbal 7 by means of a nonlinear restoring characteristic K. The value of the restoring characteristic K for angular displacements $\Phi$ near the reference position essentially determines the extent of stabilization that is achieved. This can be seen by considering the fourth term from the left in equation (1), which represents the torque that stabilizes ship 1. This torque is proportional to the angular velocity of gimbal 7, i.e., $\dot{\theta}$, and in oscillatory motion the maximum velocity $\dot{\theta}$ occurs at the reference position. Thus, to increase this maximum angular velocity $\dot{\theta}$, the restoring characteristic K in the vicinity of the reference position is decreased. In contrast to stabilization, the restoring characteristic K in the vicinity of the extremities of the angular excursion of gimbal 7 essentially determines the angular displacement $\Phi$ that takes place in the course of stabilization. This can be seen by considering that the torque required to overcome springs 18 and 19 increases with the angular displacement $\Phi$. Thus, to decrease the angular displacement $\Phi$ due to precession, the restoring characteristic K in the vicinity of the extremities of the angular excursion of gimbal 7 is increased. In other words, a nonlinear restoring characteristic K that increases as a function of angular displacement from the reference position permits optimum stabilization to take place without excessive angular displacement $\Phi$ due to precession.

In FIG. 6 a graph is shown of the restoring torque T due to springs 18 and 19 as a function of the angular displacement $\Phi$ of gimbal 7 from the reference position. The restoring characteristic K is represented by the slope of the graph. A curve 70, which has a gradually increasing slope as a function of angular displacement $\Phi$, represents the ideal nonlinear restoring characteristic K. In practice, this restoring characteristic K is most conveniently implemented by superimposing the restoring characteristic of two or more linear springs that become effective at different values of angular displacement $\Phi$. Curve 70 is approximated by straight segments 71, 72, and 73, which produce discrete changes in the restoring characteristic K at various values of angular displacement $\Phi$. Hydraulic springs that provide a composite restoring characteristic K like that represented by segments 71, 72, and 73 are commercially available. The restoring characteristic $K_1$, represented by segment 71, is selected to be of such value as to provide optimum stabilization. Thus, if the assumptions on which the derivation of equation (5) is based are valid, $$K_1 = \frac{I_2(2\pi f)}{l^2}$$

The restoring characteristic $K_2$ represented by segment 73 is determined by the maximum wave height that it is contemplated the ship will encounter. In other words, the slope of segment 73 is sufficiently large so the angular displacement $\Phi$ due to precession will not exceed 45° for the maximum contemplated peak wave height. Segments 71 and 73 are joined by segment 72. The restoring characteristic $K_3$ of segment 72 is selected to produce a smooth transition between segments 71 and 73 as the angular displacement of gimbal 7 increases. As a result, gimbal 7, frame 6, and their associated trunnions and bearings are not subjected to severe impacts as gimbal 7 rotates across the discrete changes in restoring characteristic K. In some cases, segments 71 and 73 could be connected directly together. In some cases, it might be desirable to include more intermediate segments at different increasing slopes to smooth further the transition between segments 71 and 73.

Equations (1) and (2) neglect the effect of the pitch of ship 1 about axis 3 due to the waves of the sea. The pitch of ship 1 causes an angular displacement of the gimbal assembly about axis 3 in addition to the precession due to the ship's roll. Thus, the stabilizer either overcompensates or undercompensates for the roll of ship 1, depending on the pitch. In FIG. 4, a ship 60 is depicted having gyroscopic stabilizers 61 and 62 with gimbal axes 63 and 64, respectively, parallel to athwart axis 3 of ship 60. Preferably, axes 63 and 64 are equispaced from axis 3. The rotors of stabilizers 61 and 62 spin in opposite directions. Ship 60 is subjected to an angular displacement $\Phi_P$ about axis 3 that imparts an identical angular displacement to the gimbal assemblies of stabilizers 61 and 62. Accordingly, one of the stabilizers overcompensates for the roll of the ship while the other stabilizer undercompensates. The net result is that the effect of the pitch of the ship on roll stabilization is substantially eliminated.

I claim:

1. Apparatus for stabilizing a body against oscillatory angular displacement from a reference position about a first axis comprising:
   a gimbal;
   means for rotatably supporting the gimbal with respect to the body about a second axis lying substantially perpendicular to the first axis;
   a rotor mounted on the gimbal to spin about a third axis nonparallel to the second axis; and
   means for applying a restoring torque about the second axis to the gimbal that is a function of the angular displacement of the gimbal about the second axis from the angular position in which the third axis is substantially perpendicular to the first axis, the ratio of the restoring torque to the angular displacement of the gimbal about the second axis being such a value that the frequency of the oscillatory angular displacement about the first axis lies substantially between the high- and low-frequency peaks of the angular displacement about the first axis as a function of frequency.

2. The apparatus of claim 1, in which the ratio of the restoring torque to the angular displacement of the gimbal about the second axis is substantially $I_2 (2\pi f)^2$, where $I_2$ is the moment of inertia of the gimbal assembly about the second axis and $f$ is the frequency of the oscillatory angular displacement about the first axis.

3. The apparatus of claim 2, in which the ratio of the restoring torque to the angular displacement of the gimbal about the second axis is adjustable, means are provided for sensing changes in the frequency of the oscillatory angular displacement about the first axis, and means are provided for adjusting said ratio responsive to the sensed changes in frequency so said ratio remains substantially $I_2 (2\pi f)^2$.

4. The apparatus of claim 1, in which the ratio of the restoring torque to the angular displacement of the gimbal about the second axis is said such a value for small angular displacements and is a value larger than said such a value for large angular displacements.

5. The apparatus of claim 1, in which the ratio of the restoring torque to the angular displacement of the gimbal about the second axis is adjustable, means are provided for sensing changes in the frequency of the oscillatory angular displacement about the first axis, and means are provided for adjusting said ratio responsive to the sensed changes in frequency so this frequency remains substantially between the high- and low-frequency peaks of the angular displacement as a function of frequency.

6. The apparatus of claim 1, in which the ratio of the restoring torque to the angular displacement of the gimbal about the second axis is adjustable.

7. The apparatus of claim 6, in which the means for applying a restoring torque is a spring connected between the body and the gimbal, the spring having an adjustable restoring characteristic.

8. The apparatus of claim 7, in which the spring is a hydraulic spring.

9. Apparatus for stabilizing a body against rotation about a first axis comprising:
   a gimbal;
   means for rotatably supporting the gimbal relative to the body about a second axis lying substantially perpendicular to the first axis;
   a rotor mounted on the gimbal to spin about a third axis;
   means for applying a restoring torque about the second axis to the gimbal, the restoring torque being a function of the angular displacement of the gimbal about the second axis from a reference position, and the ratio of the restoring torque to the angular displacement of the gimbal about the second axis being adjustable;
   means for adjusting the ratio of the restoring torques to the angular displacement responsive to changes in the frequency at which the body rotates about the first axis.

10. The apparatus of claim 9, in which the adjusting means maintains the ratio of the restoring torque to the angular displacement of the gimbal about the second axis substantially $I_2 (2\pi f)^2$, where $f$ is the frequency with which the body rotates about the first axis and $I_2$ is the moment of inertia of the gimbal assembly about the second axis, as $f$ changes.

11. The apparatus of claim 9, in which means are provided for sensing changes in the frequency of the rotation about the first axis and the adjusting means adjust said ratio responsive to the sensed changes in frequency to maintain the effectiveness of stabilization as the frequency of the rotation about the first axis changes.

12. Stabilizing apparatus comprising:
   a body subjected to externally applied oscillatory torques about a first axis and a second axis perpendicular to the first axis; and
   first and second gyroscopic stabilizers having oppositely spinning rotors adapted to stabilize the body against angular displacement about the first axis;
   each gyroscopic stabilizer comprising a gimbal, means for rotatably supporting the gimbal with respect to the body about an axis parallel to the second axis, means for mounting the rotor on the gimbal to spin about a third axis nonparallel to the second axis, and means for applying a restoring torque to the gimbal to return the third axis to a reference position substantially perpendicular to the first axis, the restoring torque being substantially proportional to the angular displacement of the gimbal about the second axis from the reference position for small angular displacements of the gimbal.

13. The apparatus of claim 12, in which the ratio of the restoring torque to the angular displacement is adjustable.

14. The apparatus of claim 12 in which the ratio of the restoring torque to the angular displacement of the gimbal about the first axis for each stabilizer is substantially $I_2 (2\pi f)^2$, where $f$ is the frequency of the oscillatory torques about the first axis and $I_2$ is the moment of inertia of the gimbal assembly about the second axis.

15. The apparatus of claim 12, in which each stabilizer has means responsive to changes in the frequency of the oscillatory torques about the first axis for adjusting the ratio of the restoring torque to the angular displacement.

16. The apparatus of claim 12 in which each stabilizer has means for maintaining the ratio of the restoring torque to the angular displacement substantially equal to $I_2 (2\pi f)^2$, where $f$ is the frequency of the oscillatory torques about the first axis and $I_2$ is the moment of inertia of the gimbal assembly about the second axis, as $f$ changes.

17. Apparatus for stabilizing a body against oscillatory angular displacement from a reference position about a first axis comprising:
   a gimbal;
   means for rotatably supporting the gimbal relative to the body about a second axis lying substantially perpendicular to the first axis;
   a rotor mounted on the gimbal to spin about a third axis nonparallel to the second axis; and
   means for applying a restoring torque about the second axis to the gimbal, the restoring torque varying as a nonlinear function of the angular displacement of the gimbal about the second axis from the angular position in which the third axis is substantially perpendicular to the first axis such that the ratio of the restoring torque to the angular displacement of the gimbal about the second axis is smaller for small angular displacements of the gimbal about the second axis than for large angular displacements of the gimbal about the second axis.

18. The apparatus of claim 17, in which the means for applying a restoring torque comprises a spring having a nonlinear restoring characteristic.

19. The apparatus of claim 18, in which the restoring characteristic of the spring undergoes discrete changes between which the restoring characteristic is constant, the restoring characteristic having a smaller value for small angular displacements of the gimbal about the second axis than for large angular displacements of the gimbal about the second axis.

20. The apparatus of claim 17, in which the rate of change of the restoring torque increases as a function of the angular displacement of the gimbal about the second axis from the angular position in which the third axis is substantially perpendicular to the first axis.

21. The apparatus of claim 18, in which the restoring characteristic for small angular displacements of the gimbal about the second axis is substantially $I_2 (2\pi f)^2$, where $I_2$ is the moment of inertia of the gimbal assembly about the second axis and $f$ is the frequency of the oscillatory angular displacement about the first axis and the restoring characteristic of the spring for large angular displacements of the gimbal about the second axis is substantially larger than $I_2 (2\pi f)^2$.

22. The apparatus of claim 21, in which the restoring characteristic of the spring for large angular displacements of the gimbal about the second axis is sufficiently large so the angular displacement of the gimbal due to precession does not exceed 45° for the maximum peak oscillatory torque to which the body is subjected.

PO-1050
(5/69)

5693-LTR

UNITED STATES PATENT OFFICE
CERTIFICATE OF CORRECTION

Patent No. __3,576,134__  Dated __April 27, 1971__

Inventor(s) __Samuel N. Fersht__

It is certified that error appears in the above-identified patent and that said Letters Patent are hereby corrected as shown below:

Patent column 1, line 57, "though" should be --thought--.

Patent column 3, equation (1) should be:

$$I_1 \ddot{\theta} + C_1 \dot{\theta} + Wh\theta + J\Omega\dot{\phi} = Wh\alpha(t)$$

equation (2) should be:

$$I_2 \ddot{\phi} + C_2 \dot{\phi} + Kl^2 \phi - J\Omega\dot{\theta} = 0$$

Patent column 6, lines 30, 31, and 32, "$\dot{\theta}$" should be --$\dot{\phi}$--

Patent column 7, line 7, "some" should be --other--.

Signed and sealed this 15th day of February 1972.

(SEAL)
Attest:

EDWARD M. FLETCHER, JR.
Attesting Officer

ROBERT GOTTSCHALK
Commissioner of Patents